United States Patent
Zhang et al.

(10) Patent No.: US 9,973,759 B2
(45) Date of Patent: May 15, 2018

(54) METHOD OF SIMPLIFIED CABAC CODING IN 3D VIDEO CODING

(71) Applicant: HFI INNOVATION INC., Zhubei, Hsinchu County (TW)

(72) Inventors: Kai Zhang, Beijing (CN); Yi-Wen Chen, Taichung (TW); Jian-Liang Lin, Su'ao Township, Yilan County (TW); Jicheng An, Beijing (CN); Xianguo Zhang, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days. days.

(21) Appl. No.: 14/785,011

(22) PCT Filed: Jun. 24, 2014

(86) PCT No.: PCT/CN2014/080601
§ 371 (c)(1),
(2) Date: Oct. 16, 2015

(87) PCT Pub. No.: WO2015/003554
PCT Pub. Date: Jan. 15, 2015

(65) Prior Publication Data
US 2016/0065964 A1  Mar. 3, 2016

(30) Foreign Application Priority Data

Jul. 8, 2013 (WO) ................ PCT/CN2013/078981
Dec. 26, 2013 (WO) ................ PCT/CN2013/090566

(51) Int. Cl.
*H03K 7/08* (2006.01)
*H04N 19/13* (2014.01)
(Continued)

(52) U.S. Cl.
CPC ........... *H04N 19/13* (2014.11); *H04N 19/157* (2014.11); *H04N 19/176* (2014.11);
(Continued)

(58) Field of Classification Search
CPC .... H04N 19/597; H04N 19/105; H04N 19/91; H04N 19/13; H04N 19/157;
(Continued)

(56) References Cited

U.S. PATENT DOCUMENTS

| 8,138,956 B2 | 3/2012 | Hsu et al. |
| 2009/0096643 A1 | 4/2009 | Chang |

(Continued)

FOREIGN PATENT DOCUMENTS

| CN | 101371571 A | 2/2009 |
| CN | 101599768 A | 12/2009 |

(Continued)

OTHER PUBLICATIONS

International Search Report and written opinion dated Sep. 26, 2014, issued in application No. PCT/CN2014/080601.
(Continued)

*Primary Examiner* — Rahel Guarino
(74) *Attorney, Agent, or Firm* — McClure, Qualey & Rodack, LLP

(57) ABSTRACT

A method for reducing the storage requirement or complexity of context-based coding in three-dimensional or multi-view video encoding and decoding is disclosed. The system selects the context based on selected information associated with one or more neighboring blocks of the current block conditionally depending on whether the one or more neighboring blocks are available. The syntax element is then encoded or decoded using context-based coding according to the context selection. The syntax element to be coded may correspond to an IC (illumination compensation) flag or an
(Continued)

ARP (advanced residual prediction) flag. In another example, one or more syntax elements for coding a current depth block using DMM (Depth Map Model) are encoded or decoded using context-based coding, where the context-based coding selects a by-pass mode for at least one selected syntax element.

12 Claims, 4 Drawing Sheets

(51) Int. Cl.
*H04N 19/597* (2014.01)
*H04N 19/176* (2014.01)
*H04N 19/91* (2014.01)
*H04N 19/157* (2014.01)
*H04N 19/96* (2014.01)

(52) U.S. Cl.
CPC ........... *H04N 19/597* (2014.11); *H04N 19/91* (2014.11); *H04N 19/96* (2014.11)

(58) Field of Classification Search
CPC .... H04N 19/577; H04N 19/90; H04N 19/517; H04H 40/27; H03M 7/40
USPC .......................................... 375/240.24, 240.01
See application file for complete search history.

(56) References Cited

U.S. PATENT DOCUMENTS

| | | |
|---|---|---|
| 2009/0290643 A1 | 11/2009 | Yang |
| 2009/0296806 A1 | 12/2009 | Hsu et al. |
| 2011/0096832 A1 | 4/2011 | Zhang et al. |
| 2012/0328003 A1* | 12/2012 | Chien .................. H04N 19/176 375/240.03 |
| 2013/0016782 A1* | 1/2013 | Sasai .................... H04N 19/197 375/240.13 |
| 2013/0136176 A1 | 5/2013 | Chen et al. |
| 2014/0184740 A1* | 7/2014 | Zhang .................. H04N 19/597 348/43 |

FOREIGN PATENT DOCUMENTS

| | | |
|---|---|---|
| CN | 102113326 A | 6/2011 |
| CN | 102273203 A | 12/2011 |
| WO | 2012163199 A1 | 12/2012 |
| WO | 2013017092 A1 | 2/2013 |

OTHER PUBLICATIONS

Tech, G., et al.; "3D-HEVC Draft Text 2;" Joint Collaborative Team on 3D Video Coding Extension Development of ITU-T SG 16 WP 3 and ISO/IEC JTC 1/SC 29/WG 11; Oct.-Nov. 2013; pp. 1-94.

* cited by examiner

METHOD OF SIMPLIFIED CABAC CODING IN 3D VIDEO CODING

CROSS REFERENCE TO RELATED APPLICATIONS

The present application is a national stage application of PCT/CN2014/080601, filed Jun. 24, 2014, which is a continuation in part of both PCT Patent Application, Serial No. PCT/CN2013/078981, filed on Jul. 8, 2013, entitled "A Simplified Method on Segmentation Coding in Intra Prediction" and PCT Patent Application, Serial No. PCT/CN2013/090566, filed on Dec. 26, 2013, entitled "Simplified CABAC Contexts in 3DVC". The PCT Patent Applications are hereby incorporated by reference in their entireties.

FIELD OF THE INVENTION

The present invention relates to three-dimensional video coding. In particular, the present invention relates optimized methods for CABAC (Context Adaptive Binary Arithmetic Coding) in a three-dimensional (3D) coding system.

BACKGROUND AND RELATED ART

In 3D video coding, depth information associated with the underlying texture images is useful for improving the coding efficiency as well as for rendering of synthesized views. The statistical distribution of depth data for typical scenes is usually sparse. Some depth values may not occur in depth maps. In High Efficiency Video Coding (HEVC) based three-dimensional coding standard (3D-HEVC), partition-based methods are applied for depth map Intra coding. The partition-based methods use depth map modelling (DMM) to form prediction of the current depth block based on reconstructed neighboring depth pixels. With partition-based depth map Intra coding methods, a depth block is partitioned into two segments and each segment is represented by a single constant value.

In the current version of 3D-HEVC as specified in JCT3V-D1005 ("3D-HEVC Test Model 4", Joint Collaborative Team on 3D Video Coding Extension Development of ITU-T SG 16 WP 3 and ISO/IEC JTC 1/SC 29/WG 11, 4th Meeting: Incheon, K R, 20-26 Apr. 2013, Document: JCT3V-D1005), there are four DMM modes defined corresponding to Mode 1—Explicit Wedgelet signaling, Mode 2—Intra-predicted Wedgelet partitioning, Mode 3—Restricted signaling and inter-component prediction of Wedgelet partitions and Mode 4—Inter-component-predicted Contour partitioning. The table index, wedge_full_tab_idx in DMM Mode 1 (DMM1) is binarized and represented as a fixed-length code. The bins of the table index are then coded using CABAC (Context Adaptive Binary Arithmetic Coding), where all bins share one context model. FIG. 1 illustrates an example of table index coding using a fixed-length code where bins correspond to table index represented in the fixed-length code. The bins are then compressed using an arithmetic coding engine (110) to generate coded bit-stream (120). These bins can hardly follow any particular distribution model; it may be inefficient to code the bins according to a single context model (130). The table index, wedge_predtex_tab_idx in DMM Mode 2 (DMM2) and parameter, delta_end_abs_minus1 in DMM Mode 3 (DMM 3) are coded in a similar way.

The CABAC coding usually incurs higher complexity compared to other non-context based entropy coding. In the case that the bins could hardly follow any distribution model, the benefit of higher coding efficiency of CABAC may not be realized. Therefore, it is desirable to develop coding scheme that matches the characteristics of the underlying syntax element.

CABAC is also applied to coding syntax associated with illumination compensation (IC) and advanced residual prediction (ARP) in 3D-HEVC. For each coding unit (CU), the encoder determines to either enable or disable the IC or ARP according to the rate-distortion optimization (RDO) criterion, and signals decisions as a control flag ic_flag or arp_flag in the bit-stream, where the control flag may have a value of 0 or 1.

In 3D-HEVC, CABAC is used to code the control flags, i.e., ic_flag and arp_flag based on a context model. There are 3 context models for the control flags, denoted as X_model[0], X_model[1] and X_model[2], where X corresponds to "ic" or "arp". For the current block, X_model[idx] is chosen to code X_flag, where idx is calculated as
idx=X_flag(A)+X_flag(B), if A and B are both available;
idx=X_flag(A), if A is available but B is unavailable;
idx=X_flag(B), if A is unavailable but B is available; and
idx=0, if A and B are both unavailable;
where X_flag(A) and X_flag(B) represent X_flag in the left and above neighboring blocks respectively as depicted in FIG. 3.

Accordingly, X_flag of the neighboring blocks has to be stored in order to derive idx for the current block. In the High Efficiency Video Coding (HEVC) or its extensions, such as 3D-HEVC, coding tree unit (CTU) is the basic processing unit. CTU is also referred to as largest coding unit (LCU). Since the above neighboring block may be in a different CTU from the current CTU containing the current block, a whole CTU row of X_flags above the current CTU have to be stored in order to derive idx for a current block.

Therefore, context-based coding for ic_flag or arp_flag according to the current version of 3D-HEVC requires storing the flags for a whole CTU row. Furthermore, the context-based coding will incur higher complexity than non-context based coding. It is desirable to develop methods and systems to reduce the storage requirement, the complexity, or both.

BRIEF SUMMARY OF THE INVENTION

A method for reducing the storage requirement or complexity of context-based coding in three-dimensional or multi-view video encoding and decoding is disclosed. In one embodiment, the context selection is based on selected information associated with one or more neighboring blocks of the current block conditionally depending on whether said one or more neighboring blocks are available. The syntax element is then encoded or decoded using context-based coding according to the context selection. The syntax element to be coded may correspond to an IC (illumination compensation) flag or an ARP (advanced residual prediction) flag. The IC flag is used to indicate whether illumination compensation is enabled for the current block and the ARP flag is used to indicate whether advanced residual prediction is enabled for the current block.

The one or more neighboring blocks may correspond to a left neighboring block, an above neighboring block, or both the left neighboring block and the above neighboring block of the current block. When the one or more neighboring blocks may correspond to an above neighboring block, the above neighboring block is considered unavailable if the above neighboring block is in a CTU (coding tree unit) row above a current CTU that contains the current block. When the one or more neighboring blocks may correspond to a left neighboring block, the left neighboring block is considered unavailable if the left neighboring block is in another CTU (coding tree unit) different from a current CTU that contains the current block.

The selected information associated with the neighboring blocks may correspond to the syntax element of the neighboring blocks. The syntax element may correspond to an IC flag or an ARP flag. When the one or more neighboring blocks of the current block correspond to only an above or a left neighboring block and the syntax element associated with each block corresponds to a 1-bit flag, CABAC (Context Adaptive Binary Arithmetic Coding) having two contexts can be used for the context-based coding. When the one or more neighboring blocks of the current block correspond to only an above neighboring block and the CABAC coding is used, a default CABAC context can be used when the above neighboring block is in a CTU row above a current CTU containing the current block. When the one or more neighboring blocks of the current block correspond to only a left neighboring block and the CABAC coding is used, a default CABAC context is used when the left neighboring block is in a CTU different from a current CTU containing the current block.

Another embodiment of the present invention encodes or decodes the IC flag or the ARP flag using CABAC coding, wherein no selected information associated with any neighboring block of the current block is used for determining CABAC context. When the CABAC uses multiple contexts, the context selection may be determined based on splitting depth information of CU associated with the current block. For example, the splitting depth information of the CU may correspond to the CU size or PU partition structure of the CU. The number of context required for encoding and decoding the IC flag or the ARP flag is therefore reduced from three to one. The IC flag or the ARP flag can be encoded or decoded using CABAC having only one context.

In yet another embodiment of the present invention, one or more syntax elements for coding a current depth block using DMM (Depth Map Model) are encoded or decoded using context-based coding, where the context-based coding selects a by-pass mode for at least one selected syntax element. The at least one selected syntax element may correspond to syntax element wedge_full_tab_idx, wedge_predtex_tab_idx or delta_end_abs_minus1, where wedge_full_tab_idx corresponds to a full table index in DMM Mode 1 using explicit Wedgelet signaling, wedge_predtex_tab_idx corresponds to a predicted texture table index in DMM Mode 2 using Intra-predicted Wedgelet partitioning and delta_end_abs_minus1 corresponds to delta end value in DMM Mode 3. Furthermore, the context-based coding may also select a context mode for said at least one selected syntax element. For example, the first bin is coded using the context mode and remaining bins are coded using the by-pass mode. In another example, the first N bins are coded using the context mode and remaining bins are coded using the by-pass mode, where N is an integer larger than 1. The context-based coding with by-pass more or hybrid mode may also applied to other syntax elements associated with DMM.

DETAILED DESCRIPTION OF THE INVENTION

The following description is of the best-contemplated mode of carrying out the invention. The description is intended for the purpose of illustrating the general principles of the invention and shall not be construed as limitation to the invention. The scope of the invention is best determined by reference to the appended claims.

As mentioned before, in the current version of 3D-HEVC as specified in JCT3V-D1005, the table index in DMM Mode 1 (DMM1) is binarized and represented as a fixed-length code, where all bins share one context model. Also, the table index, wedge_predtex_tab_idx, in DMM Mode 2 (DMM2) and parameter, delta_end_abs_minus1 in DMM Mode 3 (DMM 3) are coded in the similar way. However, these fixed-length codes usually do not follow any particular distribution model. Therefore, the context-based entropy coding is not effective for these codes. On the other hand, the use of context-based entropy coding incurs higher complexity. Accordingly, embodiments of the present invention use by-pass mode for the bins of the full table index, wedge_full_tab_idx of DMM1, the predicted texture table index, wedge_predtex_tab_idx, of DMM2 and the delta end value, delta_end_abs_minus1, of DMM3. For context-based coding such as CABAC (Context Adaptive Binary Arithmetic Coding), a by-pass mode may be used. In this case, the CABAC coding engine consists of two sub-engines, one for the regular coding mode (also called context coding mode in this disclosure), which includes the utilization of adaptive probability models. The other is for by-pass coding mode that offers a fast encoding of symbols.

Furthermore, the by-pass mode can also be applied to code the bins for the following syntax elements associated with various DMM modes:
1. the segment/partition line, curve, or candidate, or
2. the start/end point of the segment/partition line, curve, or candidate, or
3. the index of a selected segment/partition candidate.

Figure 1:
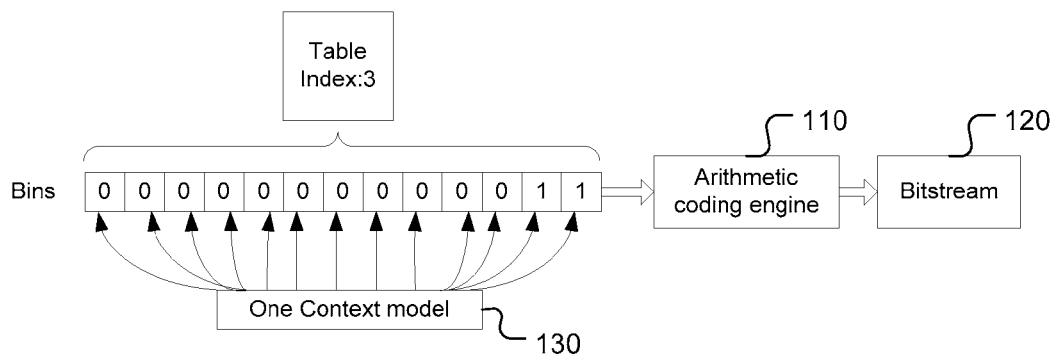
FIG. 1 illustrates an example of coding the table index associated with DMM (Depth Map Model) Mode 1 using context-based coding in the current 3D-HEVC (three-dimensional video coding based on the High Efficiency Video Coding standard).
Figure 2:
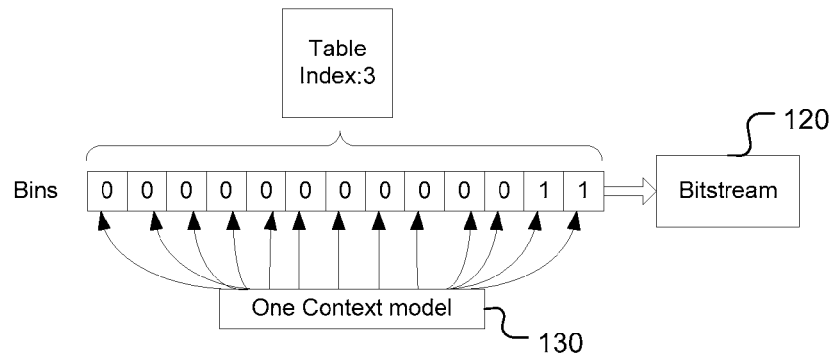
FIG. 2 illustrates an example of coding the table index associated with DMM (Depth Map Model) Mode 1 using context-based coding with a by-pass mode according to an embodiment of the present invention.
Figure 3:
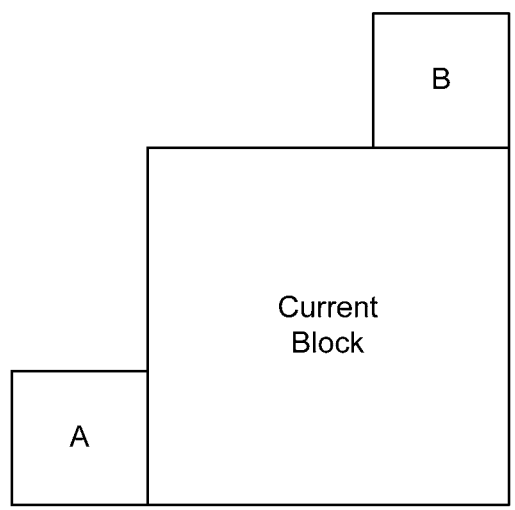
FIG. 3 illustrates an example of an above and left neighboring blocks used to select a context for coding a syntax element of the current block using context-based coding.

FIG. 2 shows an example of coding the table index in DMM1 according to an embodiment of the present invention, where the bins are coded by the by-pass coding mode of context-based coding. Another embodiment of the present invention applied hybrid bin coding to one or more of following syntax elements related to various DMM modes:
1. the full table index denoted as wedge_full_tab_idx, or
2. the predicted texture table index denoted as wedge_predtex_tab_idx, or
3. the delta end value in DMM 3 denoted as delta_end_abs_minus1, or
4. the segment/partition line, curve, or candidate, or
5. the start/end point of the segment/partition line, curve, or candidate, or
6. the index of a selected segment/partition candidate.

In the hybrid bin coding method, one or more bins are coded according to single/multiple context models and one or more bins are coded based on by-pass method. In one embodiment of the hybrid bin coding, a first bin is coded using the context mode and remaining bins are coded using the by-pass mode. For example, the first N bins are coded using the context mode and the remaining bins are coded using the by-pass mode, wherein N is an integer larger than 1.

As mentioned previously, the context-based coding for ic_flag and arp_flag in the current version of 3D-HEVC requires line buffer to store the flags or a CTU (coding tree unit) row for selection of an index to the context. In order to reduce the buffer required, several methods are disclosed as follows.

In one embodiment, the above neighboring block is considered as unavailable if it is in a CTU different from the CTU of the current block. For example, the above neighboring block is located in the above CTU row of the current CTU containing the current block.

In another embodiment, the left neighboring block is considered as unavailable if it is in a CTU different from the CTU of the current CTU. For example, the left neighboring block is located in a left CTU at the left side of the current CTU containing the current block.

In another embodiment, the above neighboring block is always considered as unavailable. Alternatively, the left neighboring block is always considered as unavailable.

In another embodiment, only two context models are required to code X_flag. For the current block, X_model[idx] is chosen to code X_flag, where idx is calculated as idx=X_flag(A) and X_flag(A) represents X_flag in the left neighboring block.

In another embodiment, only two context models are required to code X_flag. For the current block, X_model[idx] is chosen to code X_flag, where idx is calculated as idx=X_flag(B) and X_flag(B) represents X_flag in the above neighboring block.

In another embodiment, only two context models are required to code X_flag. For the current block, X_model[idx] is chosen to code X_flag. idx is calculated as idx=X_flag(B) and X_flag(B) represents X_flag in the above neighboring block if the above neighboring block is located in the current CTU row. Otherwise, idx=0, which implies that the above neighboring block is not available.

In still another embodiment, the context for CABAC does not refer to any information associated with any neighboring block. For simplicity, only one context is used by the CABAC to code the syntax element. This simple CABAC may be applied to code the IC flag, the ARP flag or other syntax element. Furthermore, multiple contexts may still be used while the CABAC does not refer to any information associated with any neighboring block. For example, the context selection among the multiple contexts can be based on the CU (coding unit) splitting depth information. The splitting depth information of the CU may correspond to CU size or PU (prediction unit) partition structure of the CU.

As mentioned earlier, the present invention is intended to reduce storage requirement, complexity, or both for coding syntax in three-dimensional or multi-view coding. The performance of a 3D video coding system incorporating the context-based coding with a by-pass mode according to an embodiment of the present invention is compared to the performance of a conventional system as shown in Table 1 for the common test condition (CTC) and in Table 2 for All Intra (AI) test condition. The performance comparison is based on different sets of test data listed in the first column. The BD-rate differences are shown for texture pictures in view 1 (video 1) and view 2 (video 2). A negative value in the BD-rate implies that the present invention has a better performance. The BD-rate measure for the coded video PSNR with video bitrate, the coded video PSNR with total bitrate (texture bitrate and depth bitrate), and the synthesized video PSNR with total bitrate are also shown. As shown in Table 1 and Table 2, there is no performance loss compared to the conventional system. Actually, some minor performance improvement has been noted. The processing times (encoding time, decoding time and rendering time) are also compared. As shown in Table 1 and Table 2, the processing times are about the same as the conventional system. Accordingly, the system that uses context-based coding with a by-pass mode according to one embodiment of the present invention incurs no performance loss compared to the conventional system while providing reduced computational complexity.

TABLE 1

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.00% | 0.11% | −0.18% | 0.00% | −0.03% | −0.01% | 101.0% | 105.3% | 101.6% |
| Kendo | 0.00% | 0.00% | 0.06% | 0.01% | −0.02% | −0.06% | 101.5% | 102.2% | 104.0% |
| Newspapercc | 0.00% | −0.04% | −0.01% | −0.02% | −0.03% | 0.00% | 100.5% | 99.2% | 100.4% |
| GhostTownFly | 0.00% | 0.12% | −0.15% | −0.01% | 0.01% | −0.05% | 101.1% | 111.1% | 103.9% |
| PoznanHall2 | 0.00% | −0.18% | −0.11% | −0.04% | −0.07% | −0.12% | 98.5% | 95.9% | 99.6% |
| PoznanStreet | 0.00% | 0.03% | −0.06% | 0.00% | −0.01% | 0.00% | 101.3% | 98.6% | 101.5% |
| UndoDancer | 0.00% | −0.05% | 0.02% | −0.01% | 0.00% | 0.05% | 100.4% | 105.3% | 98.5% |
| Shark | 0.00% | −0.02% | 0.00% | 0.00% | −0.02% | −0.01% | 102.8% | 102.9% | 99.7% |
| 1024 × 768 | 0.00% | 0.02% | −0.04% | 0.00% | −0.03% | −0.03% | 101.0% | 102.2% | 102.0% |
| 1920 × 1088 | 0.00% | −0.02% | −0.06% | −0.01% | −0.02% | −0.03% | 100.9% | 102.8% | 100.6% |
| average | 0.00% | 0.00% | −0.05% | −0.01% | −0.02% | −0.03% | 100.9% | 102.6% | 101.1% |

TABLE 2

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.00% | 0.00% | 0.00% | 0.00% | −0.01% | −0.01% | 101.0% | 99.9% | 101.2% |
| Kendo | 0.00% | 0.00% | 0.00% | 0.00% | −0.01% | −0.03% | 102.1% | 101.0% | 103.1% |
| Newspapercc | 0.00% | 0.00% | 0.00% | 0.00% | −0.01% | −0.02% | 98.1% | 100.3% | 98.8% |
| GhostTownFly | 0.00% | 0.00% | 0.00% | 0.00% | 0.00% | −0.01% | 97.8% | 98.6% | 101.4% |
| PoznanHall2 | 0.00% | 0.00% | 0.00% | 0.00% | 0.00% | 0.01% | 100.2% | 96.0% | 101.2% |
| PoznanStreet | 0.00% | 0.00% | 0.00% | 0.00% | 0.00% | −0.01% | 100.4% | 97.2% | 100.8% |
| UndoDancer | 0.00% | 0.00% | 0.00% | 0.00% | 0.00% | −0.01% | 97.0% | 96.4% | 98.6% |
| Shark | 0.00% | 0.00% | 0.00% | 0.00% | 0.00% | −0.01% | 99.2% | 99.1% | 98.6% |
| 1024 × 768 | 0.00% | 0.00% | 0.00% | 0.00% | −0.01% | −0.02% | 100.4% | 100.4% | 101.0% |
| 1920 × 1088 | 0.00% | 0.00% | 0.00% | 0.00% | 0.00% | 0.00% | 98.9% | 97.5% | 100.1% |
| average | 0.00% | 0.00% | 0.00% | 0.00% | 0.00% | −0.01% | 99.5% | 98.6% | 100.5% |

The performance of a 3D video coding system incorporating the context-based coding with reduced storage requirement and/or complexity according to an embodiment of the present invention is compared to the performance of a conventional system as shown in Table 3, where the ic_flag is coded without any information from neighboring blocks. Accordingly, the number of contexts is reduced from 3 to 1 compared to the conventional approach. Furthermore, there is no need to store a CTU row of ic_flag for the CTU row above the current CTU containing the current block. As shown in Table 3, there is no performance loss compared to the conventional system. The processing times (encoding time, decoding time and rendering time) are reduced slightly.

TABLE 3

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.0% | −0.1% | 0.0% | 0.0% | 0.0% | 99.4% | 97.0% | 98.8% |
| Kendo | 0.0% | −0.2% | −0.2% | −0.1% | −0.1% | −0.1% | 98.4% | 104.1% | 99.9% |
| Newspapercc | 0.0% | 0.0% | 0.1% | 0.0% | 0.0% | 0.0% | 97.6% | 100.2% | 98.5% |
| GhostTownFly | 0.0% | 0.0% | 0.0% | 0.0% | 0.0% | 0.0% | 98.8% | 96.7% | 97.1% |
| PoznanHall2 | 0.0% | 0.1% | 0.0% | 0.0% | 0.0% | 0.0% | 98.0% | 90.5% | 98.7% |
| PoznanStreet | 0.0% | 0.0% | 0.0% | 0.0% | 0.0% | 0.0% | 93.7% | 99.1% | 97.3% |
| UndoDancer | 0.0% | −0.1% | 0.0% | 0.0% | 0.0% | 0.0% | 96.4% | 95.0% | 95.0% |
| Shark | 0.0% | 0.0% | 0.0% | 0.0% | 0.0% | 0.0% | 97.1% | 99.6% | 101.0% |
| 1024 × 768 | 0.0% | −0.1% | −0.1% | 0.0% | 0.0% | 0.0% | 98.5% | 100.5% | 99.1% |
| 1920 × 1088 | 0.0% | 0.0% | 0.0% | 0.0% | 0.0% | 0.0% | 96.8% | 96.2% | 97.8% |
| average | 0.0% | 0.0% | 0.0% | 0.0% | 0.0% | 0.0% | 97.4% | 97.8% | 98.3% |

The performance of a 3D video coding system incorporating the context-based coding with reduced storage requirement and/or complexity according to an embodiment of the present invention is compared to the performance of a conventional system as shown in Table 4, where the context for iv_res_pred_weight_idx is only based on the left neighboring block. Accordingly, the number of contexts is reduced from 3 to 2 compared to the conventional approach. Furthermore, there is no need to store a CTU row of iv_res_pred_weight_idx for the CTU row above the current CTU containing the current block. As shown in Table 4, there is no performance loss compared to the conventional system. The processing times (encoding time, decoding time and rendering time) are reduced slightly.

TABLE 4

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.2% | 0.2% | 0.1% | 0.1% | 0.0% | 99.8% | 101.7% | 99.0% |
| Kendo | 0.0% | 0.2% | 0.2% | 0.1% | 0.1% | 0.0% | 98.4% | 104.0% | 98.1% |
| Newspapercc | 0.0% | 0.2% | 0.2% | 0.1% | 0.0% | 0.1% | 98.2% | 93.9% | 97.3% |
| GhostTownFly | 0.0% | −0.2% | −0.1% | 0.0% | 0.0% | 0.0% | 99.5% | 97.3% | 97.1% |
| PoznanHall2 | 0.0% | 0.4% | 0.3% | 0.1% | 0.1% | 0.1% | 96.9% | 100.5% | 99.7% |

TABLE 4-continued

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| PoznanStreet | 0.0% | 0.0% | −0.2% | 0.0% | 0.0% | 0.0% | 94.3% | 100.7% | 97.0% |
| UndoDancer | 0.0% | 0.1% | 0.0% | 0.0% | 0.0% | 0.0% | 93.1% | 97.2% | 93.0% |
| Shark | 0.0% | 0.1% | −0.1% | 0.0% | 0.0% | 0.0% | 94.6% | 98.4% | 95.6% |
| 1024 × 768 | 0.0% | 0.2% | 0.2% | 0.1% | 0.1% | 0.0% | 98.8% | 99.9% | 98.1% |
| 1920 × 1088 | 0.0% | 0.1% | 0.0% | 0.0% | 0.0% | 0.0% | 95.7% | 98.8% | 96.5% |
| average | 0.0% | 0.1% | 0.1% | 0.0% | 0.0% | 0.0% | 96.9% | 99.2% | 97.1% |

Figure 4:
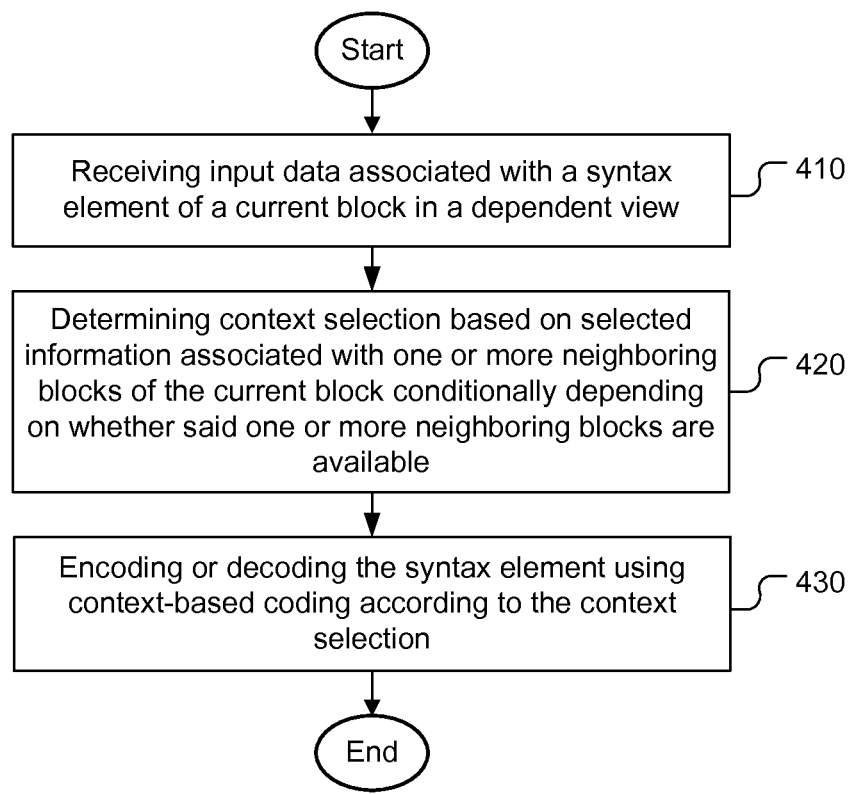
FIG. 4 illustrates an exemplary flowchart of a coding system incorporating context-based coding with reduced storage requirement according to an embodiment of the present invention.

FIG. 4 illustrates an exemplary flowchart of a three-dimensional encoding or decoding system incorporating simplified context-based coding according to an embodiment of the present invention. The system receives input data associated with a syntax element of a current block in a dependent view in step 410. For encoding, the input data corresponds to the syntax element to be encoded. For decoding, the input data corresponds to coded syntax element to be decoded. The input data may be retrieved from memory (e.g., computer memory, buffer (RAM or DRAM) or other media) or from a processor. In step 420, the context selection is determined based on selected information associated with one or more neighboring blocks of the current block conditionally depending on whether said one or more neighboring blocks are available. The syntax element is then encoded or decoded using context-based coding according to the context selection as shown in step 430.

Figure 5:
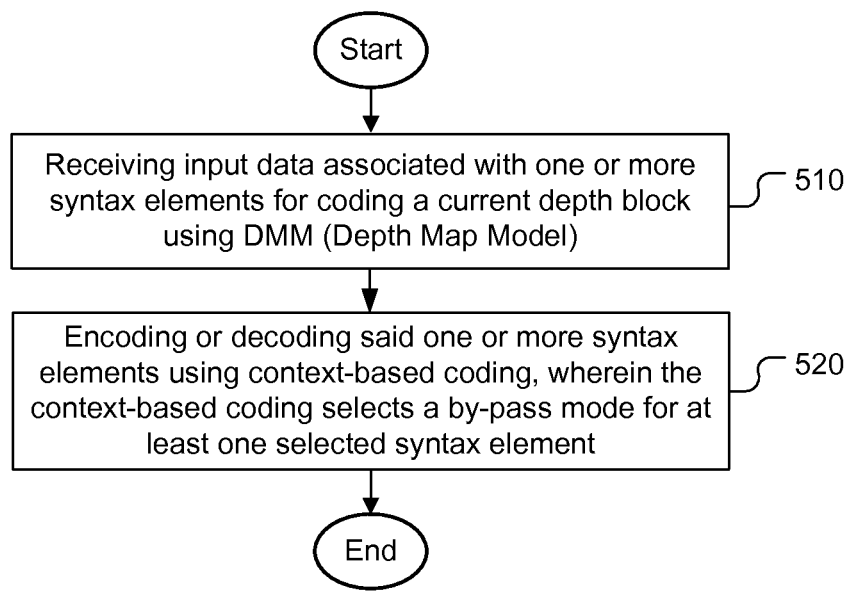
FIG. 5 illustrates an exemplary flowchart of a coding system incorporating context-based coding with a by-pass mode according to an embodiment of the present invention.

FIG. 5 illustrates an exemplary flowchart of a three-dimensional encoding or decoding system incorporating context-based coding with a by-pass mode for syntax elements for coding a current depth block using DMM (Depth Map Model) according to an embodiment of the present invention. The system receives input data associated with one or more syntax elements for coding a current depth block using DMM (Depth Map Model) in step 510. The one or more syntax elements is then encoded or decoded using context-based coding as shown in step 520, wherein the context-based coding selects a by-pass mode for at least one selected syntax element.

The flowcharts shown above are intended to illustrate examples3D or multi-view coding with simplified context-based coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding, the method comprising:
   receiving input data associated with a syntax element of a current block in a dependent view;
   conditionally determining context selection based on selected information associated with one or more neighboring blocks of the current block in a single direction depending on whether said one or more neighboring blocks are available;
   encoding or decoding the syntax element using context-based coding according to the context selection,
   wherein the selected information associated with said one or more neighboring blocks of the current block corresponds to the syntax element of said one or more neighboring blocks of the current block, and
   wherein said one or more neighboring blocks of the current block correspond to only an above or a left neighboring block, the syntax element associated with each block corresponds to a 1-bit flag, and the context-based coding corresponds to CABAC (Context Adaptive Binary Arithmetic Coding) having two contexts.

2. The method of claim 1, wherein the syntax element of the current block corresponds to an IC (illumination compensation) flag or an ARP (advanced residual prediction) flag, wherein the IC flag indicates whether illumination compensation is enabled for the current block and the ARP flag indicates whether advanced residual prediction is enabled for the current block.

3. The method of claim 1, wherein said one or more neighboring blocks of the current block correspond to a left neighboring block, an above neighboring block, or both the left neighboring block and the above neighboring block of the current block.

4. The method of claim 3, wherein said one or more neighboring blocks of the current block correspond to the above neighboring block, wherein the above neighboring block is considered unavailable if the above neighboring block is in a CTU (coding tree unit) row above a current CTU that contains the current block.

5. The method of claim 3, wherein said one or more neighboring blocks of the current block correspond to the left neighboring block, wherein the left neighboring block is considered unavailable if the left neighboring block is in another CTU (coding tree unit) different from a current CTU that contains the current block.

6. The method of claim 1, wherein the syntax element corresponds to an IC (illumination compensation) flag or an ARP (advanced residual prediction) flag, wherein the IC flag indicates whether illumination compensation is enabled for an associated block, the ARP flag indicates whether advanced residual prediction is enabled for the associated block.

7. A method for three-dimensional or multi-view video encoding or decoding, the method comprising:
receiving input data associated with a syntax element of a current block in a dependent view;
conditionally determining context selection based on selected information associated with one or more neighboring blocks of the current block in a single direction depending on whether said one or more neighboring blocks are available;
encoding or decoding the syntax element using context-based coding according to the context selection,
wherein the selected information associated with said one or more neighboring blocks of the current block corresponds to the syntax element of said one or more neighboring blocks of the current block, and
wherein said one or more neighboring blocks of the current block correspond to only an above neighboring block, the context-based coding corresponds to CABAC (Context Adaptive Binary Arithmetic Coding), and a default CABAC context is used when the above neighboring block is in a CTU (coding tree unit) row above a current CTU containing the current block.

8. A method for three-dimensional or multi-view video encoding or decoding, the method comprising:
receiving input data associated with a syntax element of a current block in a dependent view;
conditionally determining context selection based on selected information associated with one or more neighboring blocks of the current block in a single direction depending on whether said one or more neighboring blocks are available;
encoding or decoding the syntax element using context-based coding according to the context selection,
wherein the selected information associated with said one or more neighboring blocks of the current block corresponds to the syntax element of said one or more neighboring blocks of the current block, and
wherein said one or more neighboring blocks of the current block correspond to only a left neighboring block, the context-based coding corresponds to CABAC (Context Adaptive Binary Arithmetic Coding), and a default CABAC context is used when the left neighboring block is in a CTU (coding tree unit) different from a current CTU containing the current block.

9. A method for three-dimensional or multi-view video encoding or decoding, the method comprising:
receiving input data associated with a syntax element of a current block in a dependent view, wherein the syntax element corresponds to an IC (illumination compensation) flag or an ARP (advanced residual prediction) flag, the IC flag indicates whether illumination compensation is enabled for an associated block, and the ARP flag indicates whether advanced residual prediction is enabled for the associated block; and
encoding or decoding the syntax element using CABAC (Context Adaptive Binary Arithmetic Coding), wherein no selected information associated with any neighboring block of the current block is used for determining CABAC context.

10. The method of claim 9, wherein the CABAC uses multiple contexts and context selection is determined based on splitting depth information of CU (coding unit) associated with the current block.

11. The method of claim 10, wherein the splitting depth information of the CU corresponds to CU size or PU (prediction unit) partition structure of the CU.

12. The method of claim 9, wherein the syntax element is encoded or decoded using CABAC having only one context.

* * * * *